Patented Jan. 10, 1933

1,893,608

UNITED STATES PATENT OFFICE

FRANCIS CLARKE ATWOOD, OF NEWTON, MASSACHUSETTS

CASEIN SOLUTION AND METHOD OF MAKING THE SAME

No Drawing.  Application filed August 3, 1929. Serial No. 383,430.

This invention relates to a casein solution and method of making the same.

One object of the invention is to provide a novel casein solution possessing characteristics which render it particularly useful for various industrial purposes including the manufacture of water paints, the emulsification with oils to form various coating materials, as a basis of leather finishes, for paper coating work, and as a base of printing ink.

A further and more specific object of the invention is to provide a novel casein solution which is slightly acidic in nature, and in which the casein is present in a gel-like condition but with certain flow characteristics, and in which the acidic nature of the casein solution enables the same to be kept for relatively long periods of time without artificial preservative and without decomposition of the casein.

A still further object of the invention is to provide a novel and improved method of dissolving casein which is particularly useful in producing the present casein solution.

With these objects in view and such others as may hereinafter appear, the invention consists in the casein solution and in the method of dissolving casein hereinafter described and particularly defined in the claims at the end of this specification.

Prior to the present invention the solutions of casein which have been used in the various arts, as for example in the manufacture of paints, coating materials and finishes, have been alkaline in nature, having been made by dissolving the casein in solutions of alkali, such for example as solutions of borax, soda and ammonia. The resulting casein solution has been distinctly alkaline and various practical disadvantages are inherent in such solutions. Such solutions tend toward gradual peptization, hydrolysis, or putrefaction and the casein tends to be degraded to some extent or broken down to simpler and less valuable proteins, but probably the most important disadvantage from a practical point of view resides in the tendency of the casein to decompose by putrefaction. Artificial preservatives, while decreasing to some extent the tendency of the casein to thus decompose and to be degraded, are nevertheless not extensively used for the reason that all of such preservatives of which I am aware detract from the utility of the casein solution for most purposes, and are not certain and positive in their action.

When casein is dissolved in an alkaline solution, the solution of the casein takes place in a manner analogous to the solution of ordinary sugar in water, or in other words the action is a plain dissolving or gradually melting away of the casein with substantially no accompanying swelling or expansion of the casein. In accordance with the present invention, in producing a casein solution, the casein is first subjected to treatment to cause it to swell, preferably until the casein has swollen up to a mass approaching in appearance finely ground freshly precipitated curds, and thereafter the swollen casein mass is dissolved. In dissolving the swollen casein mass it is preferred to employ a mild alkali such as borax and in amounts less than normally required, to the end that the resulting casein solution may be slightly acidic in nature, or if desired the swollen casein may be dissolved in a relatively strong alkali, such as soda ash, caustic soda, or ammonia, and the solution then neutralized with a weak acid such as boric acid preferably to a point where a slight excess of acid exists but before precipitation of the casein takes place.

In order to produce the desired swelling of the casein it is preferred to employ in solution a salt which possesses the property of causing swelling of the casein, and I have experienced particularly good results with a mixture of sodium fluoride and ammonium chloride. The efficiency of such salts in causing the swelling action of the casein appears to be due to the presence of certain specific ions in the solution. The preparatory swelling action enables the casein to be dissolved in a relatively small amount of a mild alkali and enables solutions of the casein to be made which are acidic in nature, of a gel-like consistency, and which possess many practical advantages not possessed by the general alkaline casein solutions now upon the market.

The present method of dissolving casein enables a casein solution of novel characteristics to be produced. The new casein solution may be made in the form of a gel in which the casein appears to exist in a form approaching that produced by redissolving a freshly precipitated casein curd. In this form the gel-like solution may be conveniently and economically stored and shipped to be subsequently used as such, or thinned down with water as required. The gel-like solution is further characterized by its acidic nature, and because of such slight acidity, the gel-like solutions and solutions derived therefrom have excellent keeping qualities probably because the liability of alkaline hydrolysis has been removed. Such casein solutions produced in accordance with the invention as above set forth have been found to keep for relatively long periods of time without any artificial preservatives, thus enabling them to be used in many instances where the alkaline casein solutions of the prior art with their colored or otherwise undesirable artificial preservatives could not be used.

As a specific example of one method of producing a novel casein solution 55 lbs. of casein are soaked in 30 gals. of water maintained within a temperature range of from 150–160° F. To these materials are added sodium fluoride and ammonium chloride, preferably in amounts of 5 and 2 pounds respectively. After complete and extended swelling of the casein has taken place, then a mild alkali such as borax is added, in amount of about 6 pounds, and the materials agitated whereupon the swollen casein will readily dissolve producing a true casein solution, which at room temperatures becomes gel-like in consistency and which is acidic in nature.

As an alternative procedure, after the swelling of the casein has been accomplished in the manner described, then a strong alkali such as sodium carbonate, caustic soda, or even ammonia may be used to produce the casein solution, and in those instances where the keeping qualities are desired, the alkali may be neutralized with a weak acid such as boric acid, and an excess of the boric acid utilized so as to impart a distinct acidity to the casein solution. It has been found that such excess boric acid will not precipitate the casein.

As defining the characteristics of the present casein solution, and in explanation of the same, it may be stated that the present casein solution has a pH value lying upon the alkaline side of the iso-electric point for casein but upon the acid side of the iso-electric point for water. As is known, and may be determined by reference to the literature, the iso-electric point for casein has been determined to be at a pH value of 4.6 while the iso-electric point for water is 7.0. The present casein solutions have pH values between 4.6 and 7.0. The preservative characteristics of such solutions appear to be due to the fact that such solutions are acidic as compared to water.

While the preferred application of the present invention has been herein described, it is to be understood that the scope of the invention is to be determined by the following claims.

Having thus described the invention, what is claimed is:—

1. The method of making a casein solution, which consists in subjecting casein to treatment with a swelling agent such as sodium fluoride in the presence of water, maintaining the materials at an elevated temperature until the casein particles are swollen to many times their original size to form a thick gel, and dissolving the gel in a mild alkali producing a thick viscous casein solution having pH values within the limits of 4.6 and 7.0 and characterized particularly by its stability and uniform viscosity over long periods of time.

2. The method of making a casein solution, which consists in subjecting casein to treatment with a swelling agent such as sodium fluoride in the presence of water, maintaining the materials at an elevated temperature until the casein particles are swollen to many times their original size to form a thick gel, and subjecting the swollen casein gel to treatment to produce a casein solution having pH values within the limits of 4.6 and 7.0 and characterized particularly by its stability and uniform viscosity over long periods of time.

3. The method of making a casein solution, which consists in subjecting casein to treatment with a swelling agent such as sodium fluoride in the presence of water, maintaining the materials at an elevated temperature until the casein particles are swollen to many times their original size to form a thick gel, and dissolving the gel thus formed in a borax solution, producing a solution of casein having pH values within the limits of 4.6 and 7.0 and characterized particularly by its stability and uniform viscosity over long periods of time.

4. As a new article of manufacture, a thick viscous casein solution characterized by its stability and uniform viscosity over long periods of time and comprising the product resulting from swelling casein by means of a swelling agent such as sodium fluoride in the presence of water and at an elevated temperature, and dissolving the swollen casein in a manner such as to produce a thick viscous casein solution having pH values within the limits of 4.6 and 7.0 and characterized particularly by its stability and uniform viscosity over long periods of time.

5. As a new article of manufacture, a thick viscous casein solution characterized by its stability and uniform viscosity over long periods of time and comprising the product resulting from swelling casein by means of a swelling agent such as sodium fluoride in the presence of water and at an elevated temperature, and dissolving the swollen casein in a borax solution to produce a thick viscous casein solution having pH values within the limits of 4.6 and 7.0 and characterized particularly by its stability and uniform viscosity over long periods of time.

In testimony whereof I have signed my name to this specification.

FRANCIS CLARKE ATWOOD.